Dec. 12, 1944.  L. NELSON, JR  2,364,807
FISH LURE CONTAINER
Filed Oct. 9, 1943
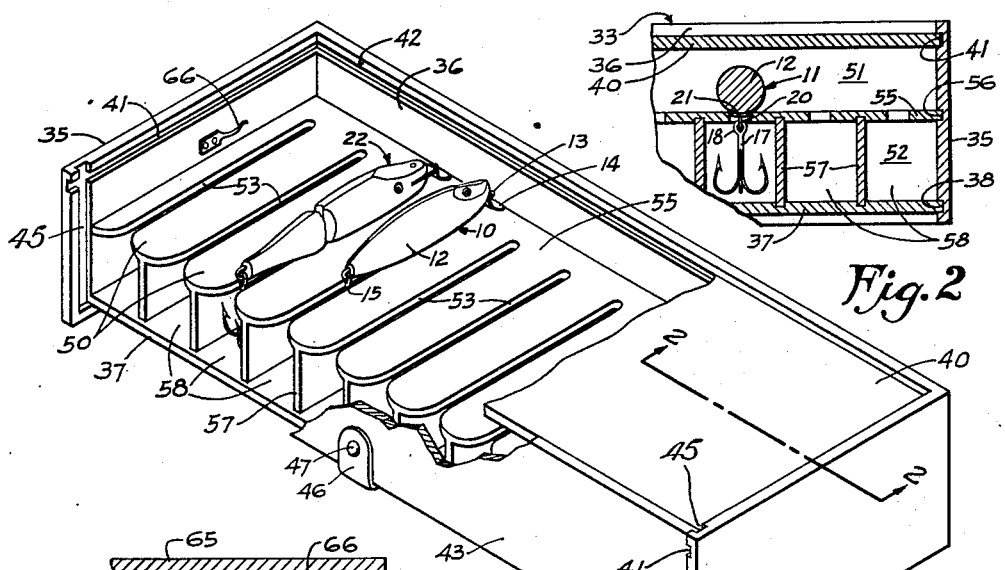
Fig. 1
Fig. 2
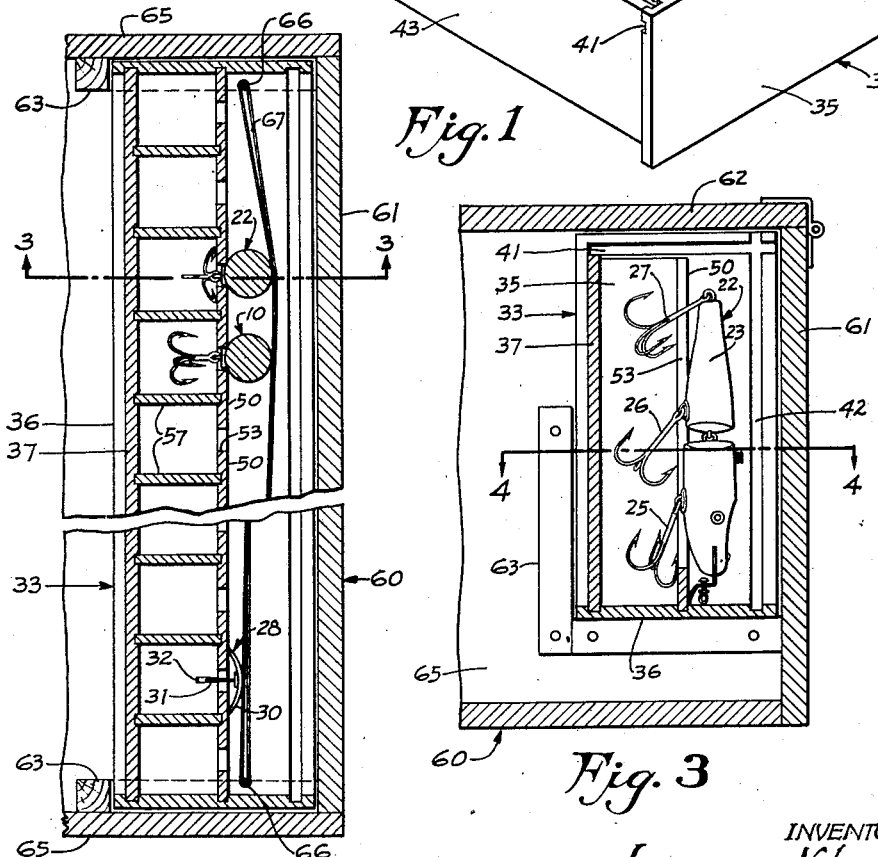
Fig. 4
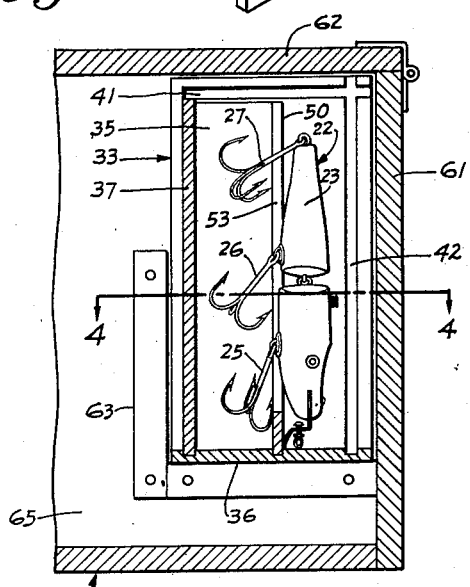
Fig. 3
INVENTOR
Lawrence Nelson, Jr.
BY
ATTYS.

Patented Dec. 12, 1944

2,364,807

UNITED STATES PATENT OFFICE 2,364,807

FISH LURE CONTAINER

Lawrence Nelson, Jr., Chicago, Ill., assignor of one-half to S. R. Pletz, Chicago, Ill.

Application October 9, 1943, Serial No. 505,594

11 Claims. (Cl. 43—32)

The present invention relates to an improved container for lures or artificial bait used by fishermen.

Lures of the type here under consideration commonly are made of wood painted to simulate live bait or are made of bright metal to attract fish by glittering reflection of light. At least one fish-hook extends laterally from the body. Usually there are two or more three-pronged hooks suspended flexibly from suitable brackets or eyes spaced along the length of the body.

It is not satisfactory to carry a number of such lures loosely in a simple receptacle. The hooks become tangled with each other; the body finishes are gouged by the hooks; the body finishes are damaged by the lure bodies rubbing and striking against each other or rubbing or striking against the receptacle walls, especially while the box is transported or being handled roughly; the lures become massed in disorderly array often with some concealed entirely. A fisherman in selecting and removing a lure from the tangled mass must exercise special care to avoid injury by the haphazardly positioned hooks.

It is one object of my invention to provide a container that will obviate such disadvantages. I propose to provide a container construction that will prevent both entanglement of the hooks and of the lure bodies' damaging movement. It is contemplated that the lures will be maintained in a desired order and that the container will open for a full view of the stock of lures and for easy removal of any lures selected.

One feature of the invention is that when the container is opened, the hooks of the lures are all surrounded by walls to protect the user's hand, no points of hooks extending into the compartment in which the lure bodies are stored. The fisherman may rapidly select and remove a lure from such container with no special care required to avoid personal injury.

It is often desirable for convenience to place such a lure container inside a larger tackle box with other gear, especially for transportation to and from a fishing locale. A further object of my invention is to provide a lure container that may be readily adapted for incorporation in a larger tackle box. To this end the preferred form of my container has walls that may be removed to convert the container into something of an open tray, the open tray being normally retained in fixed position in the tackle box and being readily removable to display the various lures in convenient and orderly array. In this regard, a feature of my invention is the concept of having the walls of the larger tackle box perform the function of the removed walls of the container.

While in many practices of my invention the design of the lure container itself is relied upon to limit movement of lures stored therein, in other practices I have the further object of providing a suitable restraining means effective to secure the lures adequately, regardless of the position of the lure container.

These various objects and advantages of my invention together with further objects will be apparent in the detailed description to follow taken with the accompanying drawing.

In the drawing,

Fig. 1 is a perspective view of a preferred form of my container with portions broken away to reveal the interior construction;

Fig. 2 is a fragmentary section taken as indicated by the line 2—2 of Fig. 1;

Fig. 3 is a vertical sectional view of my container mounted in a larger tackle box, the view being taken as indicated by the line 3—3 of Fig. 4; and Fig. 4 is a horizontal sectional view taken as indicated by the line 4—4 of Fig. 3.

In the drawing I show by way of example various forms of fish lures that may be stored in my container. A typical lure, such as the plug generally designated 10 in Fig. 1 or the plug generally designated 11 in Fig. 2, has a body 12 that is of generally circular cross-sectional configuration. On the front end of the body is an attachment eye 13 mounted on a metal lip 14. The body carries a rearward three-pronged hook 15 (Fig. 1) and a forward three-pronged hook 17 (Fig. 2). Each of the two hooks has an eye 18 linked with a complementary eye 20 on the body to permit universal pivotal movement of the hook. It may be noted in Fig. 2 that the eye 20 on the underside of the body 12 extends downwardly from a small metal bracket 21.

The lure generally designated 22 in Figs. 1 and 3 has a jointed body 23 with two three-pronged hooks 25 and 26 mounted in the described manner at longitudinally spaced points on the underside of the body and has a third hook 27 mounted on the rear end of the body.

A third example is a lure generally designated 28 in the form of a spoon comprising a bright metal body 30 with a single-prong hook 31 and a flexible guard wire 32.

The preferred form of my lure container generally designated 33 in the drawing comprises a box-like structure having two rigid end or side walls 35, a rigid side or back wall 36 and a rigid bottom wall 37. While such a structure may be made of metal or any suitable material it is here illustrated as fabricated from relatively thick non-metal panels, the bottom wall 37 being set in a groove 38 formed in the other three walls.

The described assembly is open on a first or top side and on an adjacent second or front side and provision is made to normally close these two sides in any suitable manner. For example, I may close the top with a movable wall or panel 40 that is guided in its opening and closing movements by grooves 41 in the end walls 35 and in its closed position extends into a groove 42 in the back wall 36. In like manner I may close the front side of the container with a movable wall or panel 43 to slide in vertical grooves 45 formed in the side walls 35.

Preferably some type of latch arrangement is employed to keep the box closed. For example, opening movement of the top panel or lid 40 may be blocked by the front panel or lid 43 when the front panel is in closed position as shown in Fig. 1. The front panel 43 may in turn be retained by a simple snap latch. As indicated in Fig. 1 the snap latch may comprise a flexible tab 46 secured to the underside of the bottom wall 37 and provided with a snap element 47 to engage a complementary snap element (not shown) on the front panel 43.

I prefer the described closure arrangement not only because it is simple and structurally efficient but also because it permits complete removal of the two panels 40 and 43 to convert the closed container into a convenient open tray providing maximum accessibility.

It is contemplated that the interior of the container will be divided by suitable shelf means into at least one storage space for lure bodies with an adjacent storage space for the lure hooks. In the present simple and compact arrangement a single shelf means in the form of a plurality of shelf elements 50 divides the interior of the container into an upper body storage space designated 51 in Fig. 2 and a lower hook-receiving space designated 52. The shelf elements 50 are positioned in a common plane and are spaced apart to form a plurality of slots 53, the entrances of the slots being at the front side of the container. Preferably the ends of the shelf elements 50 are rounded to form flared entrances to the slots as shown in Fig. 1. Such shelf elements may be integral parts of a shelf panel generally designated 55 that is set in grooves 56 in the end walls 35.

It is important to note in Fig. 1 that the slots 53 are of substantial length or of length comparable to the length of the fish lures and to note in Figs. 2 and 4 that the slots are of substantial width to form cradles for the rounded undersides of the bodies of lures 10, 11 and 22. The slots are of sufficient width to have a definite tendency to center the rounded bodies and to limit lateral movement of the bodies. In my preferred construction it is further contemplated that the slots 53 will be dimensioned in width to receive the small underside hook brackets 21 and to engage the opposite sides of the hook brackets as a further expedient for minimizing lateral movement of the lure bodies. Such engagement of the hook brackets by the slot walls has special utility for tending to hold a jointed body such as the body 23 in longitudinal alignment with the slot. In practice I find that a slot width of approximately one-quarter inch, or slightly more, is satisfactory.

In my preferred construction I brace or reinforce at least some of the shelf elements 50 by vertical walls 57 parallel with the slots 53, the vertical walls constituting partitions to divide the lower hook-receiving space 52 into individual hook compartments 58. Such partitions serve as positive means to prevent entanglement of hooks depending from adjacent bodies.

The manner in which the described container serves its purpose may be readily understood from the above description. When the container is closed as indicated in Fig. 1, with the various lures resting on the shelf means, the lure bodies normally are cradled in the slots 53. The cradling function of the slots and the function of the slots in engaging the hook brackets 21 are sufficient to maintain the lure bodies in place under normal conditions of handling and transportation. Forward and rearward longitudinal movement of the lure bodies, of course, is limited by the forward lid panel 43 and the back wall 36. The vertical dimension of the upper storage space 51 relative to the vertical dimension of the average lure body is preferably such that when the body of the lure is thrown upward or when the lure container is turned upside down, the body of the lure will strike the upper lid 40 before the sharp points of the lure hooks strike against the undersurfaces of the shelf elements 50.

When the fisherman is ready to use the lures in the container he removes the two lid panels 40 and 43 to convert the container into an open tray, with all of the lure bodies in plain sight and in orderly array. It will be noted in Fig. 1 that the various hooks are enclosed in the hook compartments 58 and that the fisherman may reach into the open tray to grasp the lures without danger of injury.

The manner in which the described lure container may be employed in a tackle box may be understood by reference to Figs. 3 and 4. The container with the two lid panels 40 and 43 removed may be mounted in the tackle box 60 in the position shown in Fig. 3 so that one of the rigid walls 61 of the tackle box closes the side of the container usually closed by the lid panel 40 and the hinged lid 62 of the tackle box closes the side of the container corresponding to the lid panel 43. The means for removably supporting the lure container 33 in the described position may comprise a pair of angular brackets 63 mounted on the opposite side walls 65 of the tackle box. In Fig. 4 the lure container is shown as being of a length to nest inside the tackle box.

In the form of my invention shown in Figs. 3 and 4 I provide small hooks 66 on the opposite side walls 35 of the container that may be used if desired to anchor the ends of a rubber band 67 or like elastic means for pressing the lure bodies against the shelf elements. Such a yielding retaining means is especially useful when the lure container is normally carried in the position shown in Fig. 3. If the various lure bodies are distributed progressively in accord with their cross-sectional dimensions, the rubber band 67 will be effective for retaining all of the lure bodies ranging from relatively thick bodies to relatively thin bodies as indicated in Fig. 4.

The container 33 that is stored in the tackle box in the manner indicated in Figs. 3 and 4 constitutes a readily removable open tray requiring no manipulation of lid panels. When this open tray is removed from the tackle box the elastic band 67 may be removed temporarily or may be left in place without causing any great inconvenience.

Various changes and substitutions may be made in practicing the invention described herein and therefore my appended claims are to be construed as broadly as permitted by the prior art.

I claim:

1. Means for containing fish lures having elongated bodies and hooks pending laterally from the bodies, said means comprising walls forming a container, a plurality of shelf elements arranged in a common plane in said container to define a body-receiving space on one side of the plane and a hook-receiving space on the other side of the plane, said shelf elements being spaced apart to form hook-receiving slots, and walls both bracing at least some of said shelf elements individually and partitioning said hook-receiving space to prevent entanglement of hooks of adjacent lures.

2. Means for containing fish lures having bodies of generally circular cross-sectional configuration with hooks connected to the bodies at points spaced longitudinally thereof, said means comprising walls forming a container, and shelf means in said container separating a storage space for the lure bodies on one side of the shelf means from a storage space for the hooks on the other side of the shelf means, said shelf means being formed with slots to clear the hook shanks, said slots being of sufficient longitudinal extent to cradle the curved undersides of the lure bodies.

3. Means for containing fish lures having bodies of generally circular cross-sectional configuration with hooks connected to the bodies at points spaced longitudinally thereof, said means comprising walls forming a container, shelf means in said container separating a storage space for the lure bodies on one side of the shelf means from a storage space for the hooks on the other side of the shelf means, said shelf means being formed with slots to clear the hook shanks, said slots being of sufficient longitudinal extent to cradle the curved undersides of the lure bodies, and a plurality of wall elements in at least one of said spaces connected to said shelf means and forming partitions between portions of adjacent lures.

4. Means for containing fish lures having elongated bodies and hooks pending laterally from the bodies, said means comprising walls forming a container open on a first side and on a second side adjacent thereto, a movable closure wall for said first side of the container, a shelf within said container spaced from said closure wall to define therewith a storage space for the lure bodies, there being a hook-receiving space in said container on the opposite side of the shelf, said shelf extending at one edge near to said second side of the container, said sheld having a plurality of slots extending inwardly from said edge to clear said hooks and permit the hooks to extend into said hook-receiving space, and a movable closure wall for said second side of the container to block the entrances of said slots and thereby limit outward movement of said bodies along said slots.

5. Means for containing a plurality of fish lures having elongated bodies and hooks pivotally mounted on connections at points spaced longitudinally on the underside of each body, said means comprising walls forming a container, and a shelf in said container to support said bodies on one side of the shelf and to form a space on the other side of the shelf to receive said hooks, said shelf having spaced slots extending inward from one edge to clear the shanks of said hooks, said slots being dimensioned in width to receive said hook connections and to engage the hook connections from opposite sides to limit lateral movement of the bodies relative to the shelf and to tend to maintain the bodies substantially in alignment with the slots.

6. Means for containing a plurality of fish lures having elongated bodies and hooks pivotally mounted on connections at points spaced longitudinally on the underside of each body, said means comprising walls forming a container, a shelf in said container to support said bodies on one side of the shelf and to form a space on the other side of the shelf to receive said hooks, said shelf having spaced slots extending inward from one edge to clear the shanks of said hooks, and resilient means to yieldingly press said bodies towards said shelf and thereby normally maintain the points of said hooks out of contact with the shelf.

7. Means for containing a plurality of fish lures having elongated bodies and hooks pivotally mounted on connections at points spaced longitudinally on the underside of each body, said means comprising walls forming a container, a shelf in said container to support said bodies on one side of the shelf and to form a space on the other side of the shelf to receive said hooks, said shelf having spaced slots extending inward from one edge to clear the shanks of said hooks, stretchable elastic means, and means to anchor the opposite ends of said elastic means in said container in position to yieldingly press said bodies towards said shelf.

8. Means for containing a plurality of fish lures having elongated bodies and hooks pivotally mounted on connections at points spaced longitudinally on the underside of each body, said means comprising walls forming a container, a shelf in said container to support said bodies on one side of the shelf and to form a space on the other side of the shelf to receive said hooks, said shelf having spaced slots extending inward from one edge to clear the shanks of said hooks and to form longitudinal cradles for said bodies, and resilient means to yieldingly press said bodies towards said shelf thereby to hold said bodies in said cradles.

9. Means for containing fish lures having elongated bodies and hooks pending laterally from the bodies, said means comprising walls forming a container open on a first side and on a second side adjacent thereto, a plurality of shelf elements in said container in a plane spaced from said first side of the container to form a body-receiving space, and spaced from the opposite side of the container to form a hook-receiving space, said shelf elements being spaced apart to form slots extending inwardly from said second side of the container, and removable closure walls for said first and second sides of the container, said container-forming walls being provided with slots to receive and retain said closure walls.

10. Means for use with a tackle box to contain in the tackle box a plurality of fish lures having elongated bodies and hooks extending laterally from the bodies, said means comprising walls forming a container open on a first side, which side is to lie against a side wall of the tackle box, and open on a second adjacent side, which second side is to lie adjacent the closed position of the tackle box lid, and a plurality of shelf elements in said container substantially parallel with said first open side of the container, said shelf elements being spaced from said first open side of the container to define with said side of the tackle box a lure-receiving space and being spaced from the opposite side of the container to define a hook-receiving space, said plurality of shelf elements forming a plurality of slots to clear said hooks, the entrances to said slots being adjacent said second side of the container whereby the slot entrances are blocked by the closed lid of the tackle box to limit outward movement of the lures.

11. In a tackle box having a rigid side and a lid adjacent thereto, the combination therewith of means for storing in the tackle box lures having elongated bodies and hooks extending laterally therefrom, said means comprising interconnected walls forming a container open on a first side and a second side adjacent thereto, means to hold said container in said tackle box with said open side of the container against said rigid side of the tackle box and said second side adjacent the closed position of said lid, and a plurality of shelf elements in said container in a plane spaced from said first side of the container to form a body-receiving space, and spaced from the opposite side of the container to form a hook-receiving space, said shelf elements defining slots extending inwardly from said second side of the container to clear the shanks of said hooks.

LAWRENCE NELSON, Jr.